May 26, 1970 F. B. BANAN ET AL 3,514,772

COMMUNICATION APPARATUS IN A COMPUTER SYSTEM

Original Filed May 25, 1966

INVENTORS
FREDERICK B. BANAN
JOHN W. FIGUEROA
RUSSELL C. MC GEE
ERNEST J. PORCELLI
LASZLO L. RAKOCZI

BY

ATTORNEYS 3,514,772
COMMUNICATION APPARATUS IN A COMPUTER SYSTEM

Frederick B. Banan, John W. Figueroa, Russell C. McGee, Ernest J. Porcelli, and Laszlo L. Rakoczi, Phoenix, Ariz., assignors to General Electric Company, a corporation of New York Continuation of application Ser. No. 552,981, May 25, 1966. This application May 17, 1968, Ser. No. 731,681
Int. Cl. H03k 13/02, 13/32
U.S. Cl. 340—172.5 16 Claims

ABSTRACT OF THE DISCLOSURE

In order to provide, via a memory controller, indirect communication from an input/output controller to a data processor whereby input/output controller requests may be handled efficiently without burdening the supervisory program, the input/output controller provides information sets to be stored in predetermined memory storage locations reserved for each type of request. The memory storage location in which an information set is stored is designated by the input/output controller which utilizes and updates a stored counter assigned to each type of request. In response to information received from an input/output controller, the memory controller stores an indicium identifying the requesting input/output controller and the type of request and supplies an appropriate notification signal to the processor. Under control of the supervisory program, the processor responds to the notification signal to service the input/output controller requests in coordination with other system functions.

Figure 1:
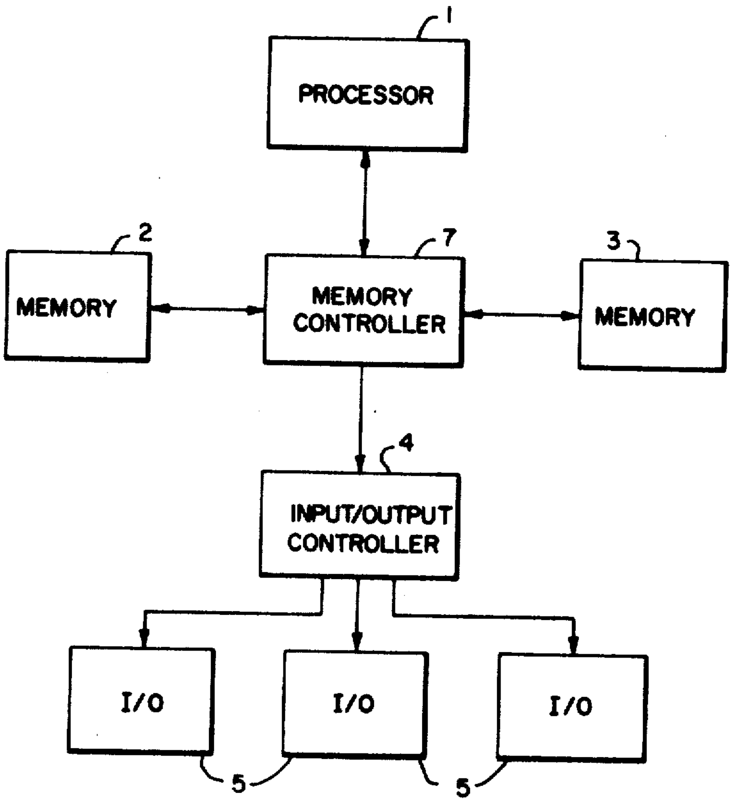

This is a continuation of our application Ser. No. 552,981, filed May 25, 1966.

This invention relates to computer systems and, in particular, to apparatus for providing communication between elements of a computer system.

A computer system normally comprises at least one data processor, at least one data storage unit and at least one input/output controller. Each input/output controller is associated with a plurality of peripheral input and output devices or subsystems. Each data processor in the computer system processes data by executing a program. Each data storage unit of the computer system stores data to be processed, data which is the result of processing, and programs for controlling the processing operations of a data processor. The peripheral input devices supply to a data storage unit, through an input/output controller, programs and data to be processed. The peripheral output devices receive processed data from a data storage unit, through an input/output controller, and utilize or store such processed data. In the described computer system, an input/output controller provides command control and a communications path for transfer of programs and data to be processed from the peripheral input devices to a data storage unit. The input/output controller also provides command control and a communications path for transfer of processed data from a data storage unit to the peripheral output devices.

A data processor of a computer system executes one or more programs. A program comprises a set of instructions, each instruction specifying a discrete type of processing operation in the computer system. A data processor executes a program by sequentially responding to each of the instructions of the program to perform the corresponding operations. The processing operations specified by the instructions of a program normally require interaction of a data storage unit with the data processor executing the program and often require a similar interaction with an input/output controller.

The entire computer system is thus responsive to the program being executed by a data processor of the computer system.

An input/output controller of the computer system performs control and information transmission operations for its respective set of peripheral input and output devices and operates as an independent processor in the computer system. An input/output controller controls the storage of information items provided by each of its associated peripheral input devices or subsystems in a respective set of storage locations of a data storage unit. Thus, in transmitting the information items supplied in succession by a particular input device, an input/output controller supplies in sequence addresses of the storage locations of a data storage unit for receiving and storing the information items. Similarly, information items for transmission to each of its associated peripheral output devices are obtained by the input/output controller from a respective set of storage locations of a data storage unit. Thus, in transmitting information items in succession to a particular peripheral output device, an input/output controller also supplies in sequence addresses of storage locations of a data storage unit for retrieving the information items.

A peripheral input subsystem is required to supply information to be processed when a program being executed by a data processor requires such data. A peripheral input subsystem is required to supply a program for execution when the computer system requires such a program. A peripheral output subsystem is required to receive information when a program being executed by a data processor has processed and made available a predetermined quantity of data in one or more of the data storage units of the computer system.

When the peripheral input and output subsystem in operation encounters certain conditions or certain contingencies, execution of a program or program part by a data processor may be required before the peripheral input or output subsystem can continue operation or before a new operation can be initiated in the peripheral input or output subsystem. Information relating to each such condition or contingency detected by an input or output subsystem must be communicated to a data processor through the corresponding input/output controller. The information to be communicated is termed a "communication set" and contains the information required by the program to correct or properly respond to the condition or contingency.

To provide most efficient operation of the above-described computer system, it is desirable to provide control apparatus to enable the data processors to execute their respective programs simultaneously and independently of each other, and to enable the input/output controllers to execute their respective control and data transmission operations simultaneously and independently of each other and substantially independently of the data processors. Accordingly, for most efficient operation of a computer system, an input/output controller which requests a data processor to execute a particular program to resolve a condition or contingency in an input or output subsystem should not be required to halt following preparation and presentation of a communication set by the input/output controller until the data processor is ready to accept the communication set. Instead, it is desirable to provide control apparatus for freeing an input/output controller to continue its functions immediately following preparation and presentation of a communication set.

In addition, to provide most efficient operation of the computer system, a data processor should be permitted to execute its program to a point at which interruption is convenient, instead of being required to suspend the program to accept a communication set immediately upon presentation of a set by an input/output controller. When a data processor is required to interrupt execution of its current program immediately upon presentation of a communication set by an input/output controller, complex apparatus must be provided to so interrupt the program and subsequently to provide full resumption of the program from the point of interruption. Accordingly, it is desirable to provide additional control apparatus for enabling transfer of a communication set between an input/output controller and a particular data processor without requiring the input/output controller to halt and without requiring immediate suspension of the program being executed by the particular data processor.

It is therefore the object of this invention to provide improved control apparatus for increasing the effectiveness and the efficiency of operation of a computer system.

It is another object of this invention to provide improved control apparatus for increasing the effectiveness of communication between an input/output controller and a data processor in a computer system.

It is a further object of this invention to provide improved apparatus in a computer system for enabling an input/output controller to communicate information concerning a peripheral subsystem to a data processor without requiring that the input/output controller halt or that the data processor immediately suspend its current operation.

To provide direct transmission of a communication set from an input/output controller to a data processor and to provide direct reception of a communication set by a data processor from an input/output controller would require a complex and costly data transmission network. Each input/output controller would require a separate data transmission link to transfer a communication set to each data processor and each data processor would require coupling into a data transmission link from each input/output controller in order to receive communication sets from all input/output controllers. Accordingly, it is desirable to provide apparatus for enabling transfer of information between an input/output controller and a data processor of a computer system without requiring the complex and costly data transmission network necessary to provide direct transmission of information therebetween.

It is therefore another object of this invention to provide apparatus for effecting simple and inexpensive communication between an input/output controller and a data processor of a computer system.

The foregoing objects are achieved, in accordance with the illustrated embodiment of the invention, by providing a computer system wherein a central controller effects indirect communication of information between an input/output controller and a data processor of the system. The central controller is coupled to communicate with all of the input/output controllers, all of the data processors and the data storage unit of the computer system. For each input/output controller of the system, a unique group of storage locations of the data storage unit is assigned to each type of program which may be requested by the input/output controller, each group of storage locations being adapted to store a plurality of communication sets. For each input/output controller of the system, a storage location is also assigned to each type of program which may be requested by the input/output controller to store a counter which is employed by the input/output controller to address the storage locations of each group associated with that input-output controller.

Each input/output controller of the system, when ready to communicate with a data processor, supplies signals representing a communication set and a code signal representing the type of program requested for execution by a data processor. The input/output controller also utilizes the appropriate counter in memory to supply an address identifying the storage location of the group corresponding to the type of program requested in which the communication set should be stored. Upon receipt of the communication set and address from the input/output controller, the central controller transmits the communication set signals to the data storage unit and initiates an operation in the data storage unit storing the communication set in a storage location of the group corresponding to the address supplied by the input/output controller. The input-output controller increments the appropriate counter to identify a storage location of the group for storing the next communication set transmitted by the input/output controller requesting the corresponding program and stores the counter in the data storage unit. Since more than one peripheral subsystem of each input/output controller may require the same type of program, a number of information sets may be present in the corresponding group of storage locations for presentation to a data processor.

The central controller also responds to the code signal furnished by the input/output controller to store in a component of the central controller an indicium indicating the type of program requested and identifying the requesting input/output controller. In response to this stored indicium, the central controller notified one of the data processors that the corresponding program requires execution. After the notified data processor reaches a point in its current program at which interruption of the program is convenient, the status of the current program is stored and execution of the requested program is initiated. The data processor commencing execution of the requested program retriexes and utilizes the information represented by the communication set.

For a complete description of the system of FIG. 1 and of our invention, reference is made to U.S. Pats. 3,413,-613 issued to D. L. Bahrs et al., on Nov. 26, 1968, and 3,409,880 issued to G. M. Galler et al., on Nov. 5, 1968, both of which patents are assigned to the assignee of the present invention. More particularly, attention is directed to FIGS. 2–120 and to the specification beginning at column 4, line 27 and ending at column 121, line 42 inclusive of U.S. Pat. 3,413,613 and to FIGS. 1–188 and to the specfictaion beginning at column 3, line 40 and ending at column 104, line 48 inclusive of U.S. Pat. 3,409,880 which are incorporated herein by reference and made a part hereof as if fully set forth herein.

Certain portions of the apparatus herein disclosed are not of our invention, but are the inventions of:

John W. Figueroa, Gary J. Goss, and Ernest J. Porcelli, as defined by the claims of their application, Ser. No. 533,138, filed May 26, 1966;

Gerald M. Galler, Ernest J. Porcelli, and Laszlo L. Rakoczi, as defined by the claims of their application, Ser. No. 553,250, filed May 26, 1966;

John W. Figueroa, Ernest J. Porcelli, and Laszlo L. Rakoczi, as defined by the claims of their application, Ser. No. 553,340, filed May 27, 1966;

John W. Figueroa, Gary J. Goss, and Ernest J. Porcelli, as defined by the claims of their application, Ser. No. 553,341, filed May 27, 1966;

Ernest J. Porcelli and Laszlo L. Rakoczi, as defined by the claims of their application, Ser. No. 553,342, filed May 27, 1966;

John W. Figueroa, Ernest J. Porcelli, and Laszlo L. Rakoczi, as defined by the claims of their application, Ser. No. 553,343, filed May 27, 1966;

Ernest J. Porcelli and Laszlo L. Rakoczi, as defined by the claims of their application, Ser. No. 553,436, filed May 27, 1966;

David L. Bahrs, John F. Couleur, Richard L. Ruth, and William A. Shelly, as defined by the claims of their application, Ser. No. 555,165, filed June 3, 1966;

Robert Cohen, John F. Couleur, and Richard L. Ruth, as defined by the claims of their application, Ser. No. 555,166, filed June 3, 1966;

David L. Bahrs, John F. Couleur, Richard L. Ruth, and William A. Shelly, as defined by the claims of their application, Ser. No. 555,491, filed June 6, 1966;

David L. Bahrs, John F. Couleur, Richard L. Ruth, and William A. Shelly, as defined by the claims of their application, Ser. No. 558,515, filed June 17, 1966;

Harry N. Cantrell and John F. Couleur, as defined by the claims of their application, Ser. No. 563,519, filed July 7, 1966;

Robert Cohen, John F. Couleur, and Richard L. Ruth, as defined by the claims of their application, Ser. No. 563,521, filed July 7, 1966;

Robert Cohen, John F. Couleur, and William A. Shelly, as defined by the claims of their application, Ser. No. 563,522, filed July 7, 1966;

Robert Cohen, William A. Shelley, and Samuel M. Vidulich, as defined by the claims of their application, Ser. No. 567,221, filed July 22, 1966;

David L. Bahrs and John F. Couleur, as defined by the claims of their application, Ser. No. 567,222, filed July 22, 1966;

John F. Couleur and Richard L. Ruth, as defined by the claims of their application, Ser. No. 569,750, filed Aug. 2, 1966;

John F. Couleur, Philip F. Gudenschwager, Richard L. Ruth, William A. Shelly, and Leonard G. Trubisky, as defined by the claims of their application, Ser. No. 577,376, filed Sept. 6, 1966;

John F. Couleur, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being assigned to the assignee of the present application.

What is claimed is:

1. In a computer system a data processor for executing a selected sequence of processing operations in response to a corresponding sequence of instructions and adapted to execute another predetermined sequence of instructions employing an information set in response to a notification signal, the combination comprising: a data storage unit comprising a plurality of storage locations for storing information, a plurality of peripheral subsystems, an input-output controller connected to said data storage unit and to said plurality of peripheral subsystems for providing a communications path between said data storage unit and each of said plurality of peripheral subsystems, means included in said input/output controller responsive to a predetermined condition occurring in one of said peripheral subsystems for generating an information set, means for transmitting said information set to a predetermined storage location of said data storage unit, and means responsive to the storage of said information set in said data storage unit for transmitting a notification signal to said data processor and for making said information set in said predetermined storage location available to said data processor.

2. In a computer system including a data processor for executing a selected sequence of processing operations in response to a corresponding sequence of instructions and adapted to execute one of a plurality of other predetermined sequences of instructions, each employing a particular information set, in response to a corresponding type of notification signal, the combination comprising: a data storage unit comprising a plurality of addressable storage locations for storing information, a group of storage locations being assigned to each type of notification signal, an input/output controller, a plurality of peripheral subsystems connected to said input/output controller, each of said subsystems adapted to generate predetermined types of request signals in response to predetermined conditions occurring in the peripheral subsystem, means included in said input/output controller responsive to each request signal generated by a peripheral subsystem for generating an information set identifying the corresponding peripheral subsystem, means for transmitting each information set corresponding to the same type of request signal in the peripheral subsystems to different storage locations of one of said groups of storage locations in said data storage unit, and control means responsive to the storage of an information set in a group of storage locations for transmitting the corresponding type of notification signal to said data processor.

3. In a computer system including a data processor for executing a selected sequence of processing operations in response to a corresponding sequence of instructions and adapted to execute one of a plurality of other predetermined sequences of instruction, each employing a particular information set, in response to a corresponding type of notification signal, the combination comprising: a data storage unit comprising a plurality of addressable storage locations for storing information, a group of storage locations being assigned to each type of notification signal, an input/output controller, a plurality of peripheral subsystems connected to said input/output controller, each of said subsystems adapted to generate predetermined types of request signals in response to predetermined conditions occurring in the peripheral subsystem, means included in said input/output controller responsive to each request signal generated by a peripheral subsystem for generating an information set identifying the corresponding peripheral subsystem, address means included in said input/output controller responsive to each request signal of a given type for generating an address of one of the storage locations of one of said groups, means responsive to the address generated by said address means for transmitting each information set corresponding to the same type of request signal in the peripheral subsystems to different storage locations of one of said groups of storage locations in said data storage unit, and control means responsive to the storage of an information set in a group of storage locations for transmitting the corresponding type of notification signal to said data processor.

4. In a computer system including a data processor for executing a selected sequence of processing operations in response to a corresponding sequence of instructions and adapted to execute another predetermined sequence of instructions employing an instruction set in response to a notification signal, the combination comprising: a data storage unit comprising a plurality of storage locations for storing information, a plurality of input/output controllers, each of said input/output controllers connected to said data storage unit, a plurality of peripheral subsystems connected to each of said input/output controllers, means included in each of said input/output controllers responsive to a predetermined condition occurring in one of its associated peripheral subsystems for generating an information set, means for transmitting the information sets generated by each input/output controller to a different group of storage locations of said data storage unit, and means responsive to the storage of an information set in one of the groups of storage locations of said data storage unit for transmitting a notification signal to said data processor and for making the information set in the corresponding group of storage locations available to said data processor.

5. In a computer system including a data processor for executing a selected sequence of processing operations in response to a corresponding sequence of instructions and adapted to execute another predetermined sequence of instructions employing an information set in response to a notification signal, the combination comprising: a data storage unit comprising a plurality of storage locations for storing information, a plurality of input/output controllers connected to said data storage unit, a plurality of peripheral subsystems connected to each of said input/output controllers, means included in each of said input/output controllers responsive to a predetermined condition occurring in one of its associated peripheral subsystems for generating an information set and a predetermined code signal, storage means included in said data storage unit for storing the code signals generated by said input/output controllers and for identifying the input/output controller corresponding to each code signal, means for transmitting the information sets generated in each of said input/output controllers to a different group of storage locations of said data storage unit, and control means responsive to the contents of said storage means for transmitting a notification signal to said data processor and for making information sets in the respective group of storage locations corresponding to the identified input/output controller available to said data processor.

6. In a computer system including a data processor for executing a selected sequence of processing operations in response to a corresponding sequence of instructions and adapted to execute another predetermined sequence of instructions employing an information set in response to a notification signal, the combination comprising: a data storage unit comprising a plurality of storage locations for storing information, a group of storage locations of said storage unit being provided for storage of information sets, a plurality of peripheral input and output subsystems, and input/output controller connected to said data storage unit and to said plurality of peripheral subsystems for providing a communications path between said data storage unit and each of said plurality of peripheral subsystems, means included in said input/output controller responsive to predetermined conditions occurring in each of said peripheral subsystems for generating an information set, said information set identifying the peripheral subsystem in which the predetermined condition occurred and identifying the state of the peripheral subsystem, means for transmitting said information set to a predetermined storage location of said group of storage locations in said data storage unit, and means responsive to the storage of said information set in said data storage unit for transmitting a notification signal to said data processor and for making said information set in said predetermined storage location available to said data processor.

7. In a computer system including a data processor for executing a selected sequence of processing operations in response to a corresponding sequence of instructions and adapted to execute one of a plurality of other predetermined sequences of instructions, each employing a particular information set, to service one of a plurality of corresponding types of requests, the combination comprising: a data storage unit comprising a plurality of addressable storage locations for storing information, a group of storage locations being assigned to each type of request, an input/output controller, a plurality of peripheral subsystems connected to said input/output controller, each of said subsystems adapted to generate predetermined types of request signals in response to predetermined conditions occurring in the peripheral subsystem, means included in said input/output controller responsive to each request signal generated by a peripheral subsystem for generating an information set identifying the corresponding peripheral subsystem, means included in said input/output controller responsive to each request signal of a given type for generating an address of one of the storage locations of the group of storage locations assigned to that type of request, means responsive to the address generated by said address means for transmitting each information set to the addressed storage location, and control means responsive to the storage of an information set in a group of storage locations for transmitting to said data processor a request for execution of the appropriate sequence of instructions by said data processor.

8. In a computer system including a data processor for executing a selected sequence of processing operations in response to a corresponding sequence of instructions and adapted to execute one of a plurality of other predetermined sequences of instructions, each employing a particular information set, to service one of a plurality of corresponding types of requests in response to a corresponding notification signal, the combination comprising: a data storage unit comprising a plurality of addressable storage locations for storing information, a group of storage locations being assigned to each type of request, an input/output controller, a plurality of peripheral subsystems connected to said input/output controller, each of said subsystems adapted to generate predetermined types of request signals in response to predetermined conditions occurring in the peripheral subsystem, means included in said input/output controller responsive to each request signal generated by a peripheral subsystem for generating an information set identifying the corresponding peripheral subsystem and identifying the state of the peripheral subsystem, address means corresponding to each type of request, each of said address means being responsive to each request signal of a corresponding type for generating an address of one of the storage locations in the group of storage locations assigned to that type of request, each of said address means includnig means for modifying the address generated by the address means so that each information set corresponding to a request signal of a given type is stored in a different storage location of the group of storage locations assigned to that type of request, means responsive to the address generated by said address means for transmitting each information set to the addressed storage location, and control means responsive to the storage of an information set in a group of storage locations for transmitting the corresponding type of notification signal to said data processor.

9. In a computer system including a data processor for executing a selected sequence of processing operations in response to a corresponding sequence of instructions and adapted to execute one of a plurality of other predetermined sequences of operation, each employing a particular information set, in response to a corresponding type of notification signal, the combination comprising: a data storage unit comprising a plurality of storage locations for storing information, a plurality of input/output controllers, each of said input/output controllers connected to said data storage unit, at least one peripheral subsystem connected to each of said input/output controllers, each of said peripheral subsystems adapted to generate predetermined types of request signals in response to predetermined conditions occurring in the peripheral subsystem, means included in each of said input/output controllers responsive to each request signal generated by a peripheral subsystem for generating an information set identifying the corresponding peripheral subsystem, address means included in each of said input/output controllers responsive to each request signal of a given type for generating an address of a storage location in a group of storage locations assigned to that type of request, means responsive to the address generated by said address means for transmitting each information set corresponding to the same type of request signal in the peripheral subsystems connected to one of said input/output controllers to different storage locations of one of said groups of storage locations in said data storage unit, and control means responsive to the storage of an information set in a group of storage locations for transmitting the corresponding type of notification signal to said data processor.

10. In a computer system including a data processor for executing a selected sequence of processing operations in response to a corresponding sequence of instructions and adapted to execute one of a plurality of other predetermined sequences of operation, each employing a particular information set, in response to a corresponding type of notification signal, the combination comprising: a data storage unit comprising a plurality of storage locations for storing information, a plurality of input/output controllers connected to said data storage units, a plurality of peripheral subsystems connected to each of said input/output controllers, means included in each of said input/output controllers responsive to each request signal generated by a peripheral subsystem for generating an information set identifying the corresponding peripheral subsystem, address means included in each of said input/output controllers responsive to each request signal of a given type for generating an address of a storage location within one of a plurality of groups of storage locations, each of said groups being assigned to a unique type of request received by one of said plurality of input/output controllers, means included in each of said input/output controllers for generating a predetermined code signal, means included in said data storage unit for storing the code signals generated by said input/output controllers and for identifying the input/output controller corresponding to each code signal, and control means responsive to the contents of said storage means for transmitting a notification signal to said data processor and for making information sets in the respective groups of storage locations corresponding to the identified input/output controller available to said data processor.

11. In a computer system including a data processor for executing a selected sequence of processing operations in response to a corresponding sequence of instructions and adapted to execute another predetermined sequence of instructions employing an information set in response to a notification signal, the combination comprising: a data storage unit comprising a plurality of storage locations for storing information, a plurality of input/output controllers connected to said data storage unit, at least one peripheral subsystem connected to each of said input/output controllers, means included in each of said input/output controllers responsive to a predetermined condition occurring in one of its associated peripheral subsystems for generating an information set and a predetermined code signal, said information set identifying the peripheral subsystem in which the predetermined condition occurred, storage means included in said data storage unit for storing the code signals generated by said input/output controllers and for identifying the input/output controller corresponding to each code signal, means for transmitting the information set generated in each of said input/output controllers to a different group of storage locations of said data storage unit, and control means responsive to the contents of said storage means for transmitting a notification signal to said data processor and for making information sets in the respective group of storage locations corresponding to the identified input/output controller available to said data processor.

12. In a computer system including a data processor for executing a selected sequence of processing operations in response to a corresponding sequence of instructions and adapted to execute another predetermined sequence of instructions employing an information set in response to a notification signal, the combination comprising: a data storage unit comprising a plurality of storage locations for storing information, a plurality of input/output controllers connected to said data storage unit, at least one peripheral subsystem connected to each of said input/output controllers, means included in each of said input/output controllers responsive to a predetermined condition occurring in one of its associated peripheral subsystems for generating an information set and a predetermined code signal, said information set identifying the peripheral subsystem in which the predetermined condition occurred and identifying the state of the peripheral subsystem, storage means included in said data storage unit for storing the code signals generated by said input/output controllers and for identifying the input/output controller corresponding to each code signal, means for transmitting the information set generated in each of said input/output controllers to a different group of storage locations of said data storage unit, and control means responsive to the contents of said storage means for transmitting a notification signal to said data processor and for making information sets in the respective group of storage locations corresponding to the identified input/output controller available to said data processor.

13. In a computer system including a data processor for executing a selected sequence of processing operations in response to a corresponding sequence of instructions and adapted to execute another predetermined sequence of instructions employing an instruction set in response to a notification signal, the combination comprising: a data storage unit comprising a plurality of addressable storage locations for storing information, a plurality of input/output controllers, each of said input/output controllers connected to said data storage unit, at least one peripheral subsystem connected to each of said input/output controllers, each of said peripheral subsystems adapted to generate predetermined types of request signals in response to predetermined conditions occurring in the peripheral subsystem, means included in each of said input/output controllers responsive to each request signal generated by a peripheral subsystem for generating an information set identifying the corresponding peripheral subsystem and identifying the state of the peripheral subsystem, address means corresponding to each type of request, each of said address means being responsive to each request signal of a corresponding type for generating an address of one of the storage locations in a group of storage locations assigned to that type of request and to the input/output controller receiving the request signal, each of said address means including means for modifying the address generated by the address means so that each information set corresponding to a request signal of a given type is stored in a different location of the group of storage locations assigned to that type of request and to the input/output controller to which the request was presented, means responsive to the address generated by said address means for transmitting each information set to the addressed storage location, and control means responsive to the storage of an information set in a group of storage locations for transmitting the corresponding type of notification signal to said data processor.

14. In a computer system including a data processor for executing a selected sequence of processing operations in response to a corresponding sequence of instructions and adapted to execute another predetermined sequence of instructions employing an information set in response to a notification signal, the combination comprising: a data storage unit comprising a plurality of storage locations for storing information, a plurality of input/output controllers connected to said data storage unit, at least one peripheral subsystem connected to each of said input/output controllers, means included in each of said input/output controllers responsive to a predetermined condition occurring in one of its associated peripheral subsystems for generating an information set and a predetermined code signal, said information set identifying the corresponding peripheral subsystem and identifying the state of the peripheral subsystem, storage means included in said storage unit for storing the code signals generated by said input/output controllers and for identifying the input/output controller corresponding to each code signal, address means corresponding to each type of request, each of said address means being responsive to each request signal of a corresponding type for generating an address of one of the storage locations in a group of storage locations assigned to that type of request and to the input/output controller receiving the request, each of said address means including means for modifying the address generated by the address means so that each information set corresponding to the request signal of a given type is stored in a different storage location of the group of storage locations assigned to that type of request and to the input/output controller receiving the request, means responsive to the address generated by said address means for transmitting each information set to the addressed storage location, and control means responsive to the contents of said storage means for transmitting a notification signal to said data processor and for making information sets in the respective group of storage locations corresponding to the identified input/output controller available to said data processor.

15. In a computer system including a data processor for executing a selected sequence of processing operations in response to a corresponding sequence of instructions and adapted to execute one of a plurality of other predetermined sequences of instructions, each employing a particular information set, to service one of a plurality of corresponding types of request, the combination comprising: a data storage unit comprising a plurality of addressable storage locations for storing information, a group of storage locations being assigned to each type of request, an input/output controller, at least one peripheral subsystem connected to said input/output controller, each of said peripheral subsystems adapted to generate predetermined types of request signals in response to predetermined conditions occurring in the peripheral subsystem, means included in said input/output controller responsive to each request signal generated by a peripheral subsystem for generating an information set identifying the corresponding peripheral subsystem and identifying the state of the peripheral subsystem, means included in said input/output controller responsive to each request signal of a given type for generating an address of one of the storage locations of the group of storage locations assigned to that type of request, means responsive to the address generated by said address means for transmitting each information set to the addressed storage location, and control means responsive to the storage of an information set in a group of storage locations for transmitting to said data processor a request for execution of the appropriate sequence of instructions by said data processor.

16. In a computer system including a data processor for executing a selected sequence of processing operations in response to a corresponding sequence of instructions and adapted to execute one of a plurality of other predetermined sequences of instructions, each employing a particular information set to service one of a plurality of corresponding types of requests, the combination comprising: a data storage unit comprising a plurality of addressable storage locations for storing information, a group of storage locations being assigned to each type of request, an input/output controller, at least one peripheral subsystem connected to said input/output controller, each of said peripheral subsystems adapted to generate predetermined types of request signals in response to predetermined conditions occurring in the peripheral subsystem, means included in said input/output controller responsive to each request signal generated by a peripheral subsystem for generating an information set identifying corresponding peripheral subsystems and identifying the state of the peripheral subsystem, means included in said input/output controller responsive to each request signal of a given type for generating an address of one of the storage locations of the group of the storage locations assigned to that type of request, means included in said address means for modifying the address generated by the address means so that each information set corresponding to a request signal of a given type is stored in a different storage location of the group of storage locations assigned to that type of request, means responsive to the address generated by said address means for transmitting each information set to the addressed storage location, and control means responsive to the storage of an information set in a group of storage locations for transmitting to said data processor a request for execution of the appropriate sequence of instructions by said data processor.

References Cited

UNITED STATES PATENTS

| | | | |
|---|---|---|---|
| 3,283,308 | 11/1966 | Klein et al. | 340—172.5 |
| 3,293,612 | 12/1966 | Ling | 340—172.5 |
| 3,337,855 | 8/1967 | Richard et al. | 340—172.5 |
| 3,409,878 | 11/1968 | Lindinger et al. | 340—172.5 |

RAULFE B. ZACHE, Primary Examiner